US012241620B2

(12) United States Patent
Dosani et al.

(10) Patent No.: US 12,241,620 B2
(45) Date of Patent: Mar. 4, 2025

(54) DUAL-POWER LANTERNS AND LIGHTING DEVICES

(71) Applicant: LB Marketing, Inc., Alpharetta, GA (US)

(72) Inventors: Kaif Dosani, Lawrenceville, GA (US); Douglas Kaye, Alpharetta, GA (US); Kelly Hires, Alpharetta, GA (US); Lauren Lindley, Atlanta, GA (US)

(73) Assignee: LB Marketing, Inc., Alpharetta, GA (US)

( * ) Notice: Subject to any disclaimer, the term of this patent is extended or adjusted under 35 U.S.C. 154(b) by 3 days.

(21) Appl. No.: 18/467,772

(22) Filed: Sep. 15, 2023

(65) Prior Publication Data

US 2024/0102642 A1 Mar. 28, 2024

Related U.S. Application Data

(60) Provisional application No. 63/409,613, filed on Sep. 23, 2022.

(51) Int. Cl.

*F21V 23/04* (2006.01)
*F21S 9/02* (2006.01)
*F21V 23/02* (2006.01)

(52) U.S. Cl.

CPC ................ *F21V 23/04* (2013.01); *F21S 9/02* (2013.01); *F21V 23/023* (2013.01)

(58) Field of Classification Search

CPC .......... F21V 23/023; F21V 23/04; F21S 9/02; F21L 4/085; F21L 4/08; F21L 4/005; F21L 4/00

See application file for complete search history.

(56) References Cited

U.S. PATENT DOCUMENTS

| | | | | |
|---|---|---|---|---|
| 4,388,674 A * | 6/1983 | Sano | F21V 15/02 | 362/399 |
| 11,754,233 B1 * | 9/2023 | Hwang | F21V 23/06 | 362/183 |
| 2011/0012518 A1 * | 1/2011 | Tarter | F21L 4/027 | 315/160 |
| 2019/0063696 A1 * | 2/2019 | Grandadam | F21V 15/01 | |
| 2020/0340632 A1 * | 10/2020 | Longarzo | F21L 4/02 | |

FOREIGN PATENT DOCUMENTS

| | | | | |
|---|---|---|---|---|
| CA | 2202081 A1 * | 6/1998 | | |
| CN | 115264415 A * | 11/2022 | | |
| WO | WO-2016118691 A1 * | 7/2016 | | F21L 4/027 |

OTHER PUBLICATIONS

Inovation Q+ NPL Search (Year: 2024).*

* cited by examiner

*Primary Examiner* — Anabel Ton
(74) *Attorney, Agent, or Firm* — Perilla Knox & Hildebrandt LLP; Kenneth A. Knox

(57) ABSTRACT

Various embodiments of dual-powered lighting devices are described. In some examples, the device includes a first light source with a first power source, a second light source with a second power source, and one or more switching devices that switch between using the first light source with the first power source, the second light source with the second power source, and a combination of both light sources and both power sources.

20 Claims, 6 Drawing Sheets

DUAL-POWER LANTERNS AND LIGHTING DEVICES

CROSS-REFERENCE TO RELATED APPLICATION

This application claims the benefit of and priority to U.S. Provisional Patent Application No. 63/409,613, entitled "MORF DUAL-POWER LANTERN CONCEPT," filed Sep. 23, 2022, the contents of which are hereby incorporated herein by reference in its entirety.

BACKGROUND

Several forms of portable lighting devices exist. For instance, a handheld lamp, lantern, or flashlight can provide convenience as portable lighting devices in a wide variety of environments. A flashlight can refer to a portable handheld electric light source. The light source can include an incandescent light bulb, one or more light-emitting diodes (LEDs), and other types of light sources. Handheld and portable lighting devices can use a portable power source.

FIELD OF THE INVENTION

The present invention relates to a portable lighting device. More specifically, the present invention relates to a lantern or another lighting device having multiple power sources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
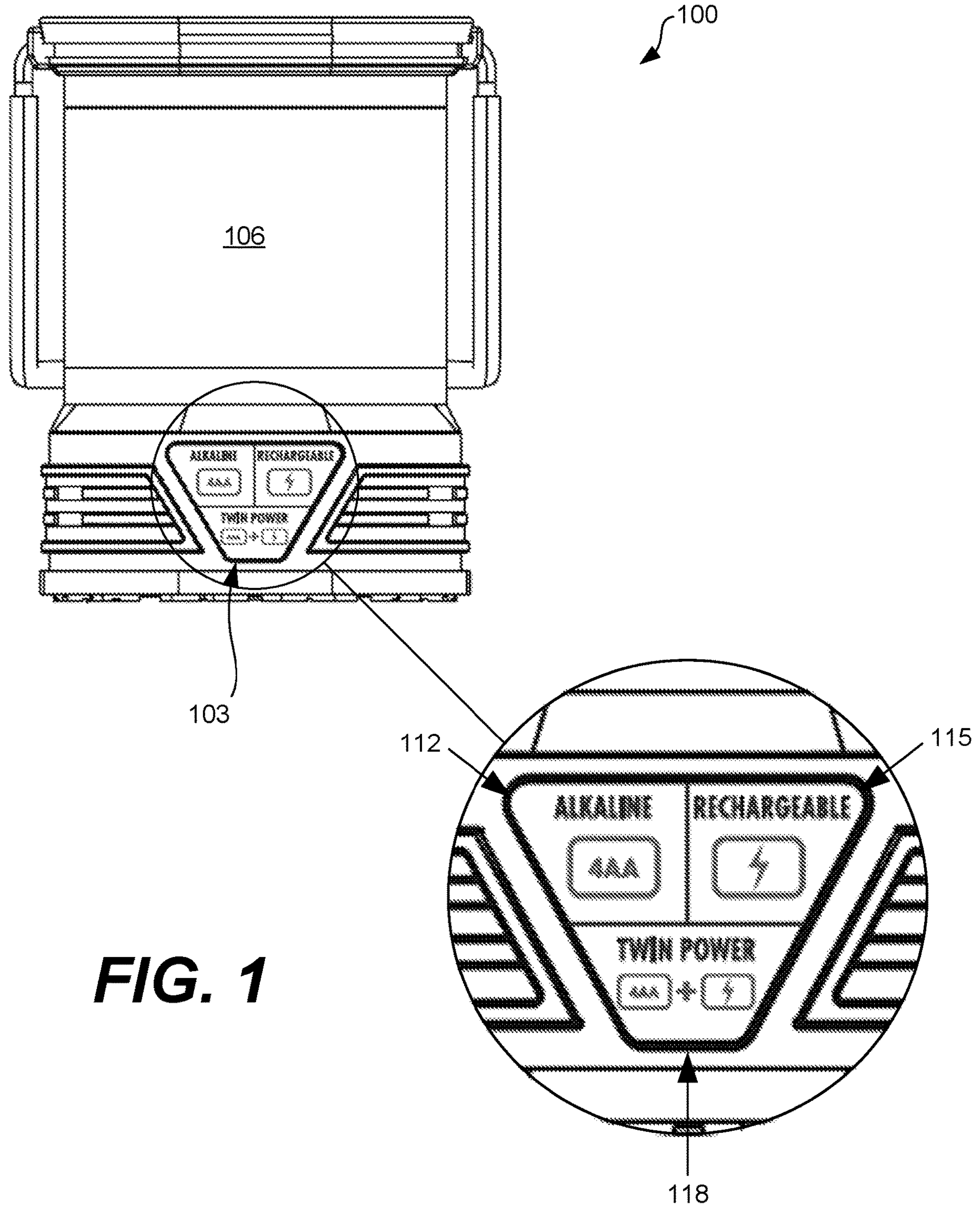
FIG. 1 is a drawing that shows a front view of a dual-power lighting device and a detail view of an example power selector component, in accordance with various embodiments of the present disclosure.

The present invention relates to a dual-power lanterns and other lighting devices. More specifically, the present invention relates to a flashlight, lantern, or another lighting device having multiple power sources. Generally, a dual-power lighting device can include first and second power sources for powering the light source. In one example embodiment, the first power source is one or more rechargeable battery and the second power source is one or more alkaline or other non-rechargeable batteries. A user operating the light source can use a power selector with one or more buttons to select among the first power source, the second power source, or both. In some examples, each selection provides a different level, intensity, or amount of lighting output. In some examples, the light sources and power delivery channels used by each power source are separate, but can be used individually or together by selection using a multiple-source power selector.

In some example embodiments, the rechargeable battery is built into the light source, and the alkaline batteries are removable and replaceable by a user. For example, the rechargeable battery or batteries can be held in a permanently or semi-permanently sealed chamber within the dual-power source lighting device. The alkaline batteries can be held in a replaceable battery compartment that is easily user-accessible and openable using a toolless port, hatch, door, cover, or other opening. In further example embodiments, the dual-power source lighting device can include a dual-power battery cartridge that holds and provides two different types of power sources. For example, the dual-power battery cartridge can hold a first power source, such as rechargeable batteries, in a permanently or semi permanently sealed portion, the dual-power battery cartridge can hold a second power source, such as non-rechargeable batteries, in an open or unsealed portion of the dual-power battery cartridge. The dual-power battery cartridge can provide separate power outputs for the two different power sources.

The dual-power lighting device can include a number of different power selections or modes. A low intensity mode can use alkaline batteries for a long runtime. A medium intensity mode can use the rechargeable power source. A high intensity mode can use both alkaline and rechargeable power sources to achieve higher lumens by combining both power sources and engaging both light sources to emit light more brightly than either low or medium intensity modes, for example, through a single diffuser or lens.

The dual-power lighting device can include a charging indicator on top of the lantern. Alternatively, the charging indicator can be on the side or bottom of the device. In some examples, a word such as a branding or other word can be illuminated to show a charging status for the rechargeable battery. In other examples, a bar, or another shape or shapes can be illuminated. A portion of the word or shape(s) that is illuminated can correspond to an amount of charge in the rechargeable battery power source. Otherwise, a numerical or other indication can be provided.

The dual-power lighting device can include a collapsible hook, handle, or bail that includes at least a portion that collapses against or extends substantially parallel to at least a portion of a periphery of the dual-power lighting device when in the closed position. In some examples, the portion that collapses against or extends substantially parallel to a periphery of the dual-power lighting device can be perpendicular to a second portion of the handle that extends from a pivot hinge at a top or upper portion of the dual-power lighting device.

The dual-power lighting device can include selection indicators located behind each power selector button that illuminates white (or another color) once the selected button is activated. The dual-power lighting device can include low power indicators located behind each power selector button that illuminates red or another color once the selected power source is running low.

The dual-power lighting device can include multiple power sources including an alkaline or non-rechargeable power source and a rechargeable power source. The replaceable power source can include non-rechargeable alkaline batteries, or other types of replaceable or disposable batteries that are easily accessed through a toolless access hatch. The rechargeable power source can include a battery such as a Lithium-Ion, Nickel-Metal Hydride, Lithium Polymer, Nickel-Cadmium, Nickel-Zinc, or other type of rechargeable power source that is permanently or semi permanently embedded within the dual-power lighting device. Semi-permanent embedding can refer to embedding such that a destructive, tool-requiring, and/or a multi-step disassembly process is required for removal of the embedded power source. The dual-power lighting device can include a Universal Serial Bus (USB)-C type of other type of charging port for the rechargeable power source. The dual-power lighting device can include an Ingress Protection rating such as IPX4 or another ingress or weather rating.

The following is a description of various examples of the present disclosure with reference to the drawings. The drawings examples are described to set forth for a clear understanding of the principles of the disclosure, but are not intended to be limiting as to form or shape.

FIG. 1 shows a front view of the dual-power lighting device in the form of a dual-power lantern 100 and a detail view of an example multiple-source power selector 103. The dual-power lantern 100 can also include a light diffuser 106. The light diffuser 106 can alternatively be a lens or another light emission area or component that does not diffuse the light from the light source or sources of the dual-power lantern 100.

The multiple-source power selector 103 of the dual-power lantern 100 can provide a user with the ability to select among a first power source, a second power source, or both. The power sources of the dual-power lantern 100 can include an alkaline, replaceable, or other non-rechargeable power source, as well as a rechargeable power source.

The multiple-source power selector 103 can provide one or more button, slider, toggle, or other types of physical selection components that a user can interact with to select between two or more power sources, and any combination thereof. This can control various modes of the dual-power lantern 100. The multiple-source power selector 103 shown can include three separate power selector buttons or components. In other examples, the multiple-source power selector 103 can include a single button that selects between modes by a number of times the button is depressed, or another mechanism such as a single selector that slides or otherwise physically moves into three (or more) different positions corresponding to three (or more) power source selection options corresponding to the various power sources and combinations thereof.

In the example shown, the power selectors can include an alkaline or replaceable power selection component 112, a rechargeable power selection component 115, and a "twin power" or combined power selection component 118. The three power selectors of the multiple-source power selector 103 can be provided using an integrated button such as a single soft silicone membrane that covers separate buttons, or alternatively using three wholly separate physical buttons, or a single button or nodule that can be moved into three (or more) positions.

The multiple-source power selector 103 can also provide one or more light or illuminated indicators that provide a power selection status. The power selection status can indicate which power source is selected and in use for the dual-power lantern 100. In this example, the multiple-source power selector 103 shows a separate power status light or other indicator for each power source of the device. In other examples, a single power status indicator can change a color, a hue, a pattern, icon, cutout, or another feature in order to indicate the selected power source. The multiple-source power selector 103 can also include a "low battery" light or indicator for each power source of the device. In some examples, the power selection status indicator can change colors and/or pulse to indicate low battery or low power remaining. Pulsing can refer to changing intensity, activation status such as on and off, or any combination thereof.

The low battery indicators can have a different color than the power status indicators. For example, the general power status indication for each selection can be green, while the low battery indication is red. The low battery indicator can pulsate indicating that the power is low, whether the color is different or the same. In some examples, when the low battery power status indicator illuminates, then the power status indicator is off.

The color, shade of color, and brightness for each power status indicator corresponding to corresponding power source selections can be different. In an example with different colors are used as differentiation, the alkaline power indicator can be a first color, while the rechargeable power indicator can be a second color, and the dual-power indicator can include both the first color and the second color, or can be a third color. The third color can be a color that results from mixing or blending the first color and the second color. In an example where light brightness or intensity is used as differentiation, the alkaline power indicator can be a first brightness, while the rechargeable power indicator can be a second brightness higher than the first brightness, and the dual-power indicator can have a third brightness higher than the first and the second brightness.

The dual-power lantern 100 can also include one or more power level indicator, which can indicate a charge level or power level for a selected power source. In some examples a single power level indicator is used for all power sources, and in other examples, different power level indicators are used for each power source. The "combined power" power level can indicate a percentage of the total power that remains, inclusive of both power sources, or a power level of the lowest total power or lowest percentage of power between the power sources. The indication of lowest total power or lowest percentage of power can be used since once one of the power sources is depleted, the "combined power" mode will no longer operate at its highest illumination level.

A specific charge level can also be provided. The specific charge level can refer to a fraction or percentage of the total. The charge levels, power type selection, and other information discussed for the power status indicator or indicators can be shown as a number of lights, a length (distance) of light illumination across a bar, a status light color, a predetermined light flashing and/or an intensity fluctuation pattern, and so on.

The dual-power lantern 100 can also include circuitry that can automatically switch power sources once power for a particular one (or more) of the power sources are detected to include a power level at or below a threshold power level for the selected power source. In some examples, the "switching" threshold power level is lower than a "low power warning" threshold power level that causes the low power indicator to illuminate. The dual-power lantern 100 can, for example, automatically switch from rechargeable power or combined power, to replaceable power if rechargeable power is depleted to the switching threshold. The dual-power lantern 100 can automatically switch from replaceable power or combined power to rechargeable power once replaceable power is depleted to the switching threshold.

The multiple-source power selector 103, including the rechargeable power selection component 112, the replaceable power selection component 115, and the combined power selection component 118, can also be used to select a lighting mode of a primary light source of the dual-power lantern 100. In various modes for a selected power source, the light source can be set to flash, pulsate, or strobe; can be set to provide a constant light source typical to a flashlight; can be set to a particular color; can be set to continuously or periodically change colors; can be set to various luminous intensities, and other operations as can be appreciated. The illuminated status indicators can indicate the selected mode, in some embodiments.

Figure 2:
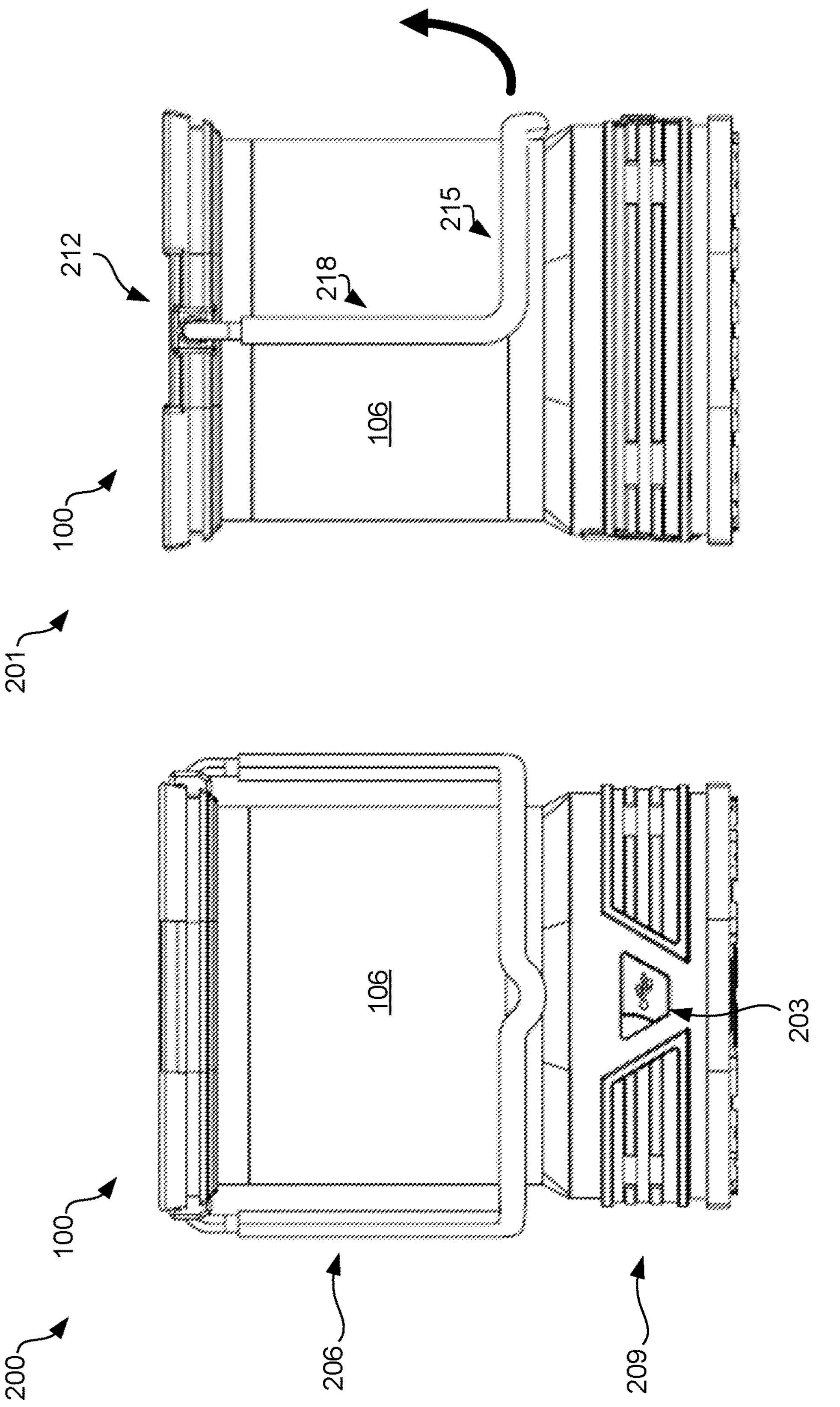
FIG. 2 is a drawing that shows back and side views of the dual-power lighting device, in accordance with various embodiments of the present disclosure.

FIG. 2 shows additional views of an example dual-power lighting device corresponding to the dual-power lantern 100 of FIG. 1. The views include a back view 200 and a side view 201 of the dual-power lantern 100. From the back view 200, the dual-power lantern 100 is seen to include a charging port 203, which can include a charging port cover. The dual-power lantern 100 can also include a rotatable hook, hanger, or other bail 206, as well as a static handle or grip 209.

The charging port 203 can connect to a primary circuit component or a charging circuit that provides a connection to a rechargeable power source. The charging port 203 can include a standardized or proprietary power connector. Standardized power connectors can include barrel plug connectors, universal serial bus (USB) type connectors, and others. USB connectors can include USB-A, USB-B, USB-C, Mini USB-A, Mini USB-B, Micro USB-A, Micro USB-B, and others. While the charging port 203 can be located on the body of the dual-power lantern 100, it can alternatively be located on the top or the bottom of the dual-power lantern 100.

The bail 206 can rotate about an axis provided by two attachment points 212 located at a top portion or top half or quarter of the dual-power lantern 100. One of the attachment points 212 is seen in the side view 201. The attachment points 212 can provide for rotation of the bail 206 as indicated by the arrow. The attachment points 212 can also provide a friction fit component or nodule that the bail 206 slips over or into so that it is held in the closed position.

The bail 206 can include at least a portion 215 that collapses against or extends substantially parallel to at least a portion of a periphery of the dual-power lantern 100 when in the closed position as shown. In some examples, the portion 215 that collapses against or extends substantially parallel to a periphery of the dual-power lighting device can be perpendicular to a second portion 218 of the bail 206 that extends from a pivot hinge provided by the attachment points 212 at a top or upper portion of the dual-power lantern 100. An indent or lip at a center point of the bail 206 can allow for hanging the dual-power lantern 100 from a hook, stud, nail, or other item. The exterior or periphery of the dual-power lantern 100 can also provide a friction fit component or nodule that the bail 206 slips over or into so that it is held in the closed position using part of the portion 215

The grip 209 can provide a static or unmoving holding point for handholding the dual-power lantern 100. The grip 209 can include a plastic, rubberized, silicone, or other material that includes ridges that help prevent vertical and/or horizontal slipping when held. While shown in the lower half or lower quarter of the dual-power lantern 100, a grip 209 can additionally or alternatively be included at an upper half or upper quarter of the device.

The charging port 203 can charge a rechargeable power source such as a battery that is permanently installed within the body of the dual-power lantern 100, or a battery that is sealed within a dual-power source cartridge of the dual-power lantern 100. Examples of the dual-power source cartridge are provided in U.S. application Ser. No. 18/130,024, which is hereby incorporated herein by reference. The dual-power lantern 100 can use a dual-power source cartridge, and can include the power connector mechanisms and alignment mechanisms and other mechanisms described therein to ensure the power connections are not reversed, thereby preventing the charging port 203 from charging the replaceable power source. The dual-power lantern 100. The replaceable, alkaline, or non-rechargeable power source can be directly inserted into the dual-power lantern 100, for example, into a battery compartment in the body once a toolless opening battery hatch is opened. The toolless opening battery hatch can be hinged or unhinged in various examples, and can be completely detachable or can be opened while remaining attached to a tether or hinge.

Figure 3:
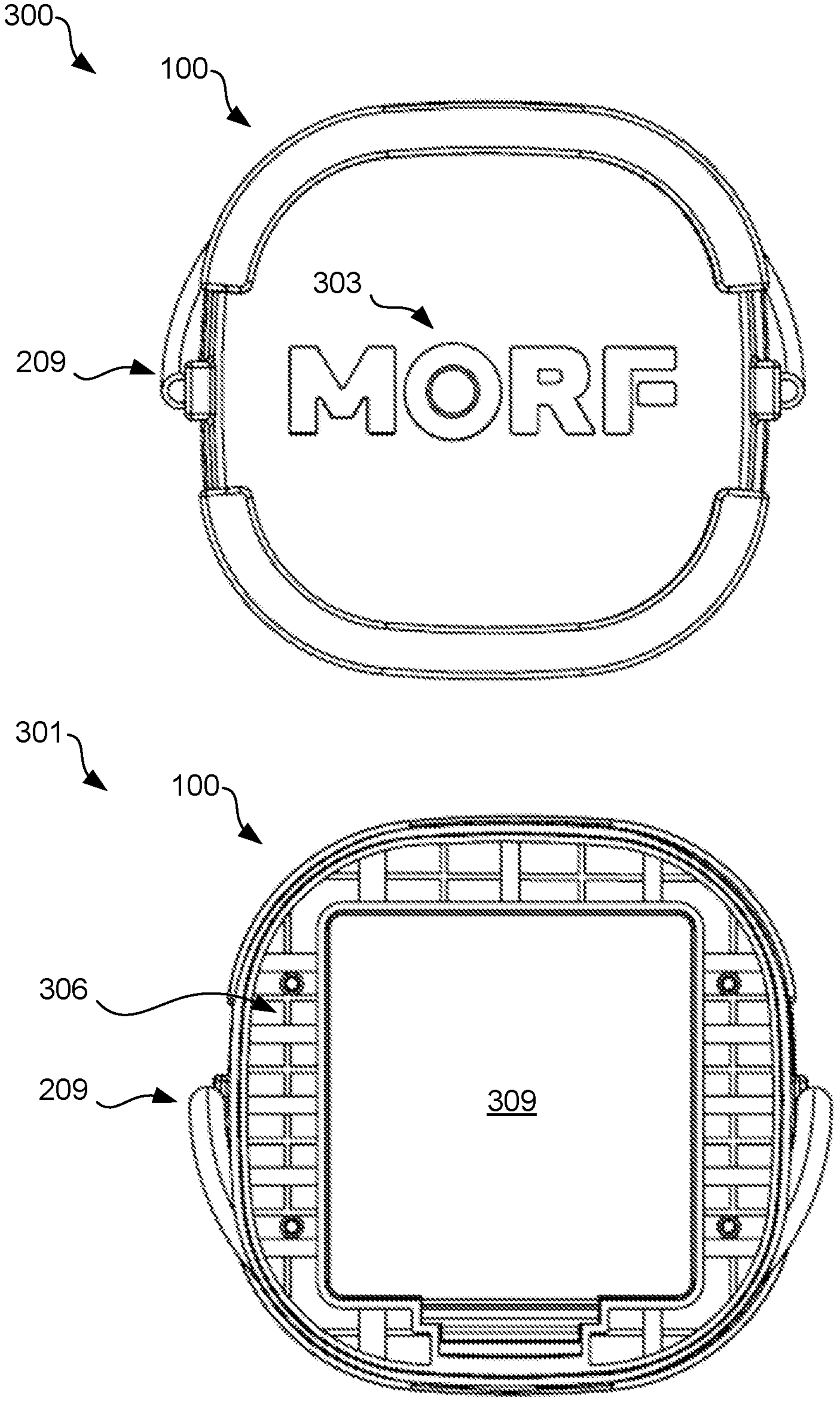
FIG. 3 is a drawing that shows top and bottom views of the dual-power lighting device, in accordance with various embodiments of the present disclosure.

FIG. 3 shows additional views of an example dual-power lighting device corresponding to the dual-power lantern 100 of FIG. 1. The views of FIG. 3 include a top view 300 and a bottom view 301 of the dual-power lantern 100. From the top view 300, a branded charging indicator 303 can be seen on a top of the dual-power lantern 100. While the charging indicator 303 in this example is shown as a branding word or symbol, a bar, or another shape or shapes can be illuminated to provide the charging indicator 303. A portion of the word or shape(s) that is illuminated can correspond to an amount of charge in the rechargeable battery power source. Otherwise, a numerical or other indication can be provided. In other examples, the charging indicator 303 can be on the side or bottom of the device.

From the bottom view 301, a foot or base 306 is shown connected at a bottom of the dual-power lantern 100. The base 306 can include a rubberized, plastic, metal or other appropriate material. The base 306 can include a texture, surface design, or grip pattern that prevents slipping and lateral movement of the dual-power lantern 100, for example, when placed on a substantially horizontal surface. A toolless opening battery hatch 309 is also shown. The toolless opening battery hatch 309 can be hinged or unhinged in various examples, and can be completely detachable or can be opened while remaining attached to a tether or hinge. In this example, the toolless opening battery hatch 309 can open using a press-in clip that clips closed at the bottom of the image as shown. The clip can be pulled towards the top of the image as shown in order to open the toolless opening battery hatch 309.

In various examples, the toolless opening battery hatch 309 can provide access to removable, disposable, or replaceable batteries such as alkaline batteries that are removable and replaceable by a user. The batteries can include any standard sized batteries such as AA, AAA, D, C, and other battery sizes.

The alkaline batteries can be held in a replaceable battery compartment that is easily user-accessible and openable using toolless opening battery hatch 309. The toolless opening battery hatch 309 can include a toolless port, hatch, door, cover, or other opening. In further example embodiments, the toolless opening battery hatch 309 can open to expose a dual-power battery cartridge that holds and provides two different types of power sources. For example, the dual-power battery cartridge can hold a first power source, such as rechargeable batteries, embedded in a permanently or semi permanently sealed portion; the dual-power battery cartridge can hold a second power source, such as non-rechargeable batteries, in an open or unsealed portion of the dual-power battery cartridge. The dual-power battery cartridge can provide separate power outputs for the two different power sources. Semi-permanent embedding can refer to embedding such that a destructive, tool-requiring, and/or a multi-step disassembly process is required for removal of the embedded power source.

Figure 4:
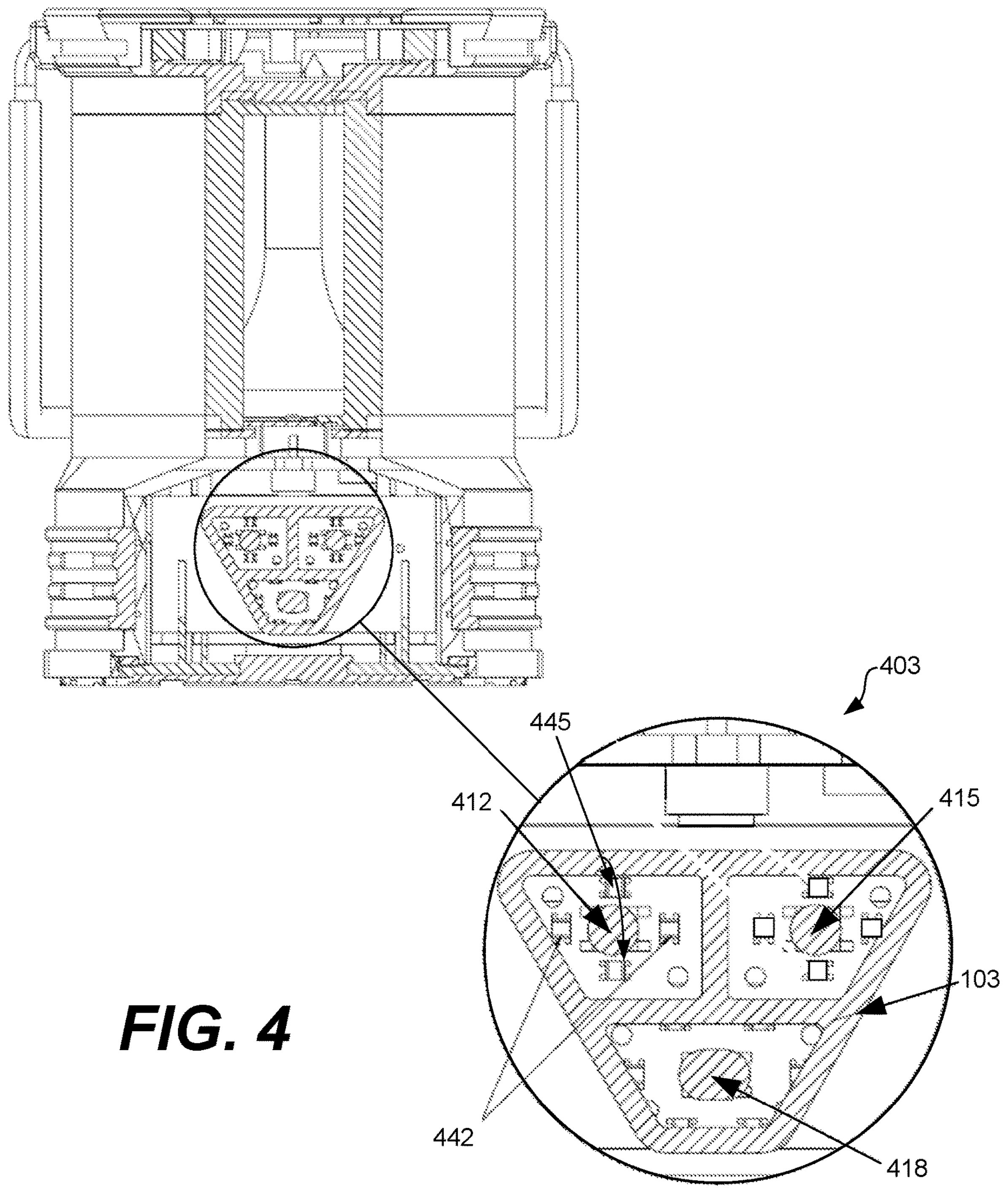
FIG. 4 is a drawing that shows a front cross-sectional view of the dual-power lighting device, in accordance with various embodiments of the present disclosure.

FIG. 4 shows a back view of the dual-power lantern 100 that includes top to bottom sliced cross-section view and detail. A cross-section detail view 403 shows electronic details of the multiple-source power selector 103 (see FIG. 1). The cross-section detail view 403 shows an electronic button 412, an electronic button 415, and an electronic button 418. The electronic buttons 412, 415, and 418 can correspond to respective power selection component areas of the multiple-source power selector 103. For example, the electronic button 412 can correspond to the power selection component 112, the electronic button 415 can correspond to the power selection component 115, and the electronic button 418 can correspond to the power selection component 118.

The cross-section detail view 403 also shows power selection lights 442 and low power lights 445. In this example LED lights can be used for power selection lights 442 and low power lights 445, but other examples can include other devices for illumination. Each of the multiple-source power selectors 103 is shown to include a number of LEDs corresponding to power selection lights 442 and low power lights 445. A multiple-source power selector 103 can also provide one or more light or illuminated indicators that provide a power selection status using the power selection lights 442. The power selection status can indicate which power source is selected and in use for the dual-power lantern 100. The multiple-source power selector 103 can also include a "low battery" light or indicator for each power source of the device using the low power lights 445.

The low power lights 445 can have a different color than the power selection lights 442. For example, the general power status indication for each selection can be white, while the low battery indication is red. The low power lights 445 can pulsate indicating that the power is low, whether the color is different or the same. In some examples, when the low power lights 445 illuminate, the power selection lights 442 automatically turn off, since power selection choice can still be provided using the low power lights 445 for the particular power selection area of the multiple-source power selector 103.

Figure 5:
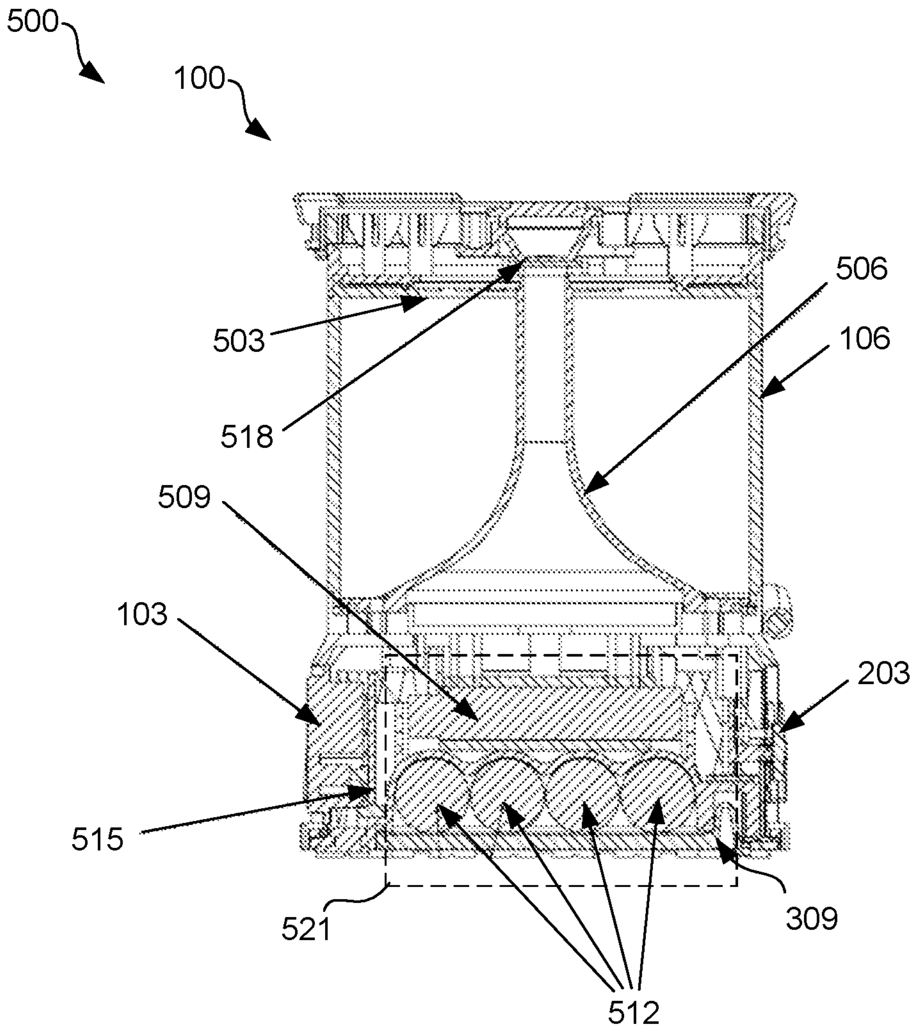
FIG. 5 is a drawing that shows a side cross-sectional view of the dual-power lighting device, in accordance with various embodiments of the present disclosure.

FIG. 5 shows a side cross-sectional view 500 of a dual-power lighting device corresponding to the dual-power lantern 100 of FIG. 1. The cross-sectional view shows the internal components of the dual-power lantern 100. From this cross-sectional view 500, the dual-power lantern 100 is shown to include a number of light sources 503 such as LEDs, and a reflector 506 that reflects light through the diffuser, lens or other light emission component 106.

The light sources 503 can include separately-powered LEDs or other light sources corresponding to rechargeable-power lights and replaceable-power lights. In some examples, the rechargeable-power lights are on the same circuit board, but in other examples, they are on a different circuit board relative to the replaceable-power lights. In either case, the light sources 503 for each power source can reflect off the same reflector 506 and through the same diffuser 106 or light emission area or component. In some examples, a rechargeable-power circuit that includes the rechargeable-power lights and the rechargeable power source 509 are electrically separate from a replaceable-power circuit that includes the replaceable-power lights and the replaceable power source 512. In some examples, while these circuits are separate, a control circuit 515 of the dual-power lantern 100 can control switches of each of the separate lighting power circuits.

The various power sources can provide a different (or the same) amount of light. For example, activating or lighting a subset of the light sources 503 using the rechargeable power source 509 can provide a higher, lower, or the same amount of light or lumens as activating another subset of the light sources 503 using the replaceable power source 512. However, when both power sources are used to activate all of the light sources 503, the result can be a higher amount of light than either of the power sources individually.

For example, the dual-power lantern 100 can include a number of different power selections or modes. A low intensity mode can use replaceable power source 512 for a lower amount of light with a longer runtime. A medium intensity mode (higher than the low) can use the rechargeable power source 509 for a higher amount of light, perhaps with a shorter runtime based on the higher power draw. However, the run time can be any amount relative to other modes, based on the amount of power held by respective power sources. A high intensity mode can use both rechargeable power source 509 and replaceable power source 512 concurrently to achieve higher light output by combining both power sources and engaging both light sources to emit light more brightly than either low or medium intensity modes. It can be noted that rather than having different light sources in varying directions such as different reflectors, diffusers, lenses, and areas, the dual-power lantern 100 can use all of the light sources for the same reflector, diffuser, lens, and area. This provides multiple backups as well as intensity options that are convenient for users.

For example, if a user enables a rechargeable power mode (or a dual power mode), the dual-power lantern 100 can use this until rechargeable power is depleted to a threshold power level, and then the low power mode can be manually or automatically enabled. The user can then be aware, both based on the lighting level and the power selection indicators, that the replaceable power mode is being used. If available, the user can then charge the device rather than depleting the disposable or replaceable power source 512. As a result, the device can reduce the amount of times the batteries must be replaced. This is the case whether the device includes a twin power mode or is limited to modes that use the rechargeable power source 509 and replaceable power source 512 individually. In some examples where rechargeable power source 509 and replaceable power source 512 are used individually, a same set of light sources 503 on a single circuit can be used to emit light, rather than using different subsets of the light sources 503 on separate circuits.

The cross-sectional view 500 shows the illumination source 518 of the charging indicator light 303. This can be part of the rechargeable-power circuit. The illumination source 518 can provide an indication of a charge level of the rechargeable power source 509, and can also flash, strobe, pulse, or generate a solid light portion to provide an indication that the rechargeable power source 509 is charging.

The cross-sectional view 500 shows the multiple-source power selector 103 and the charging port 203. The charging port 203 can be part of the rechargeable-power circuit. The multiple-source power selector 103 connect to the control circuit 515.

In the example shown, the rechargeable power source 509 is permanently or semi-permanently embedded into a user-inaccessible portion of the dual-power lantern 100. In other words, even when the toolless opening battery hatch 309 is opened or removed, the rechargeable power source 509 remains inaccessible. In the example shown, the replaceable power source 512 can include four disposable and replaceable batteries such as alkaline batteries or nickel cadmium batteries, which are removable through the toolless opening battery hatch 309. The batteries can include any standard sized batteries such as AA, AAA, D, C, and other battery sizes. The batteries can be held in a replaceable battery compartment that is easily user-accessible and openable using toolless opening battery hatch 309.

In further example embodiments, the toolless opening battery hatch 309 can open to expose a dual-power battery cartridge 521 that holds and provides rechargeable power source 509 and the replaceable power source 512. For example, the dual-power battery cartridge 521 can hold rechargeable power source 509 embedded in a permanently or semi permanently sealed portion; the dual-power battery cartridge 521 can hold a replaceable power source 512, such as non-rechargeable batteries, in an open, unsealed, or toolless access portion of the dual-power battery cartridge 521. The dual-power battery cartridge 521 can provide separate power outputs for the two different power sources, which can connect to the two separate lighting power circuits discussed. Semi-permanent embedding can refer to embedding such that a destructive, tool-requiring, and/or a multi-step disassembly process is required for removal of the embedded power source.

Figure 6:
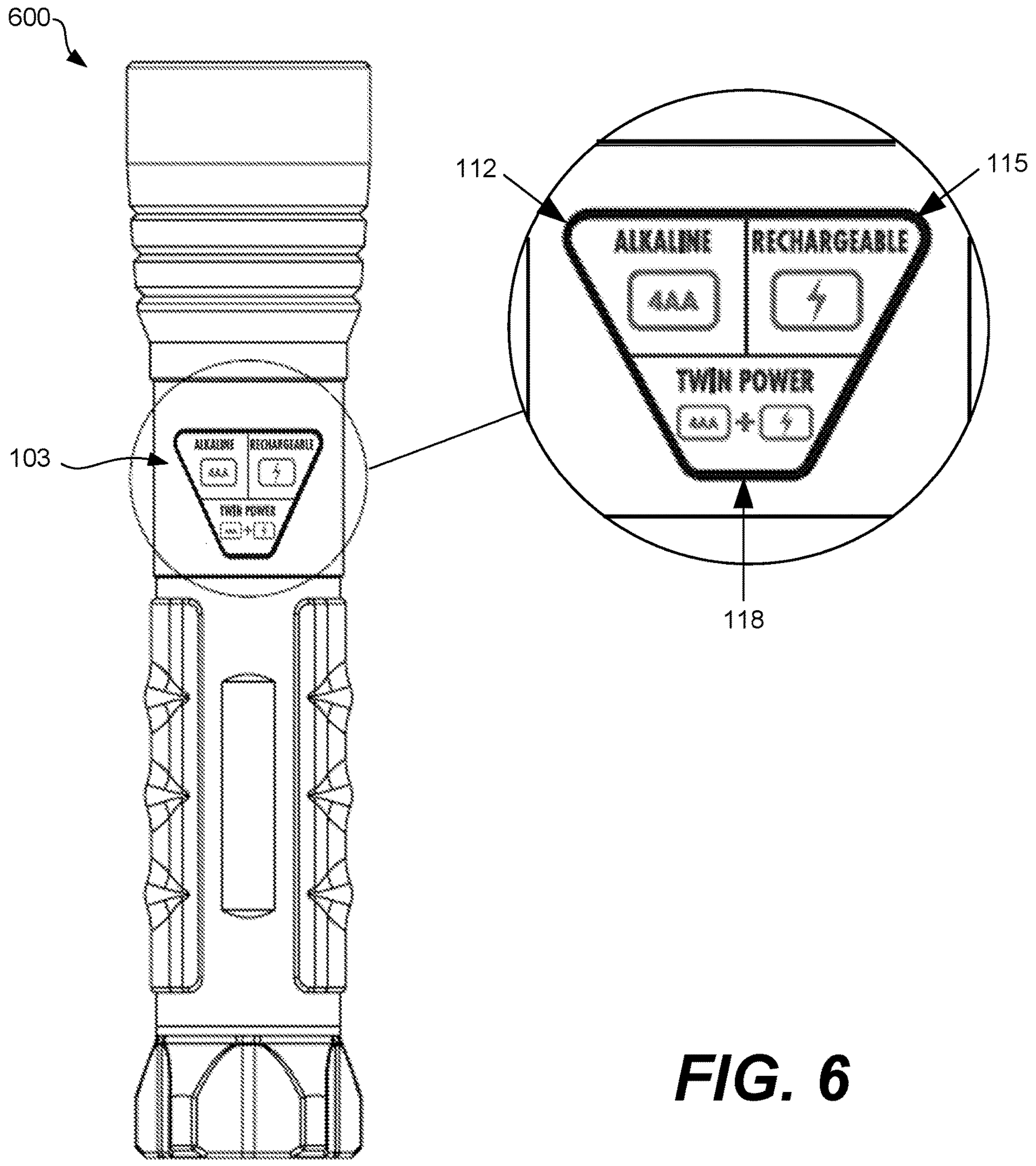
FIG. 6 is a drawing that shows a side view of another example of a dual-power lighting device, in accordance with various embodiments of the present disclosure.

FIG. 6 is a drawing that shows a side view of another example of a dual-power lighting device corresponding to a dual-power flashlight 600. As can be seen, the dual-power flashlight 600 can include the multiple-source power selector 103 as described for the other dual-power lighting devices such as the dual-power lantern 100. Although provided in a different form factor, the dual-power flashlight 600 can use the multiple-source power selector 103 to select between two or more power sources and any combination thereof. In the example shown, the power selectors can include an alkaline or replaceable power selection component 112, a rechargeable power selection component 115, and a "twin power" or combined power selection component 118. The three power selectors of the multiple-source power selector 103 can be provided using an integrated button such as a single soft silicone membrane that covers separate buttons, or alternatively using three wholly separate physical buttons, or a single button or nodule that can be moved into three (or more) positions. Likewise, the dual-power flashlight 600 can include a set of lights that emits that is reflected by a flashlight reflector and through a flashlight lens. As with the other embodiments discussed herein, the set of lights can include a subset of lights powered by a replaceable or non-rechargeable power source and another subset of lights powered by a rechargeable power source, all of which produce light for reflections by a reflector and/or through a lens or diffuser.

Although relative terms are used in this specification, such as "up" and "down" to describe the relative relationship between one component and another component of an icon, these terms are used in this specification for convenience only, for example according to the directions of the examples described in the drawings. It can be understood that if the device is turned upside down, the component described "up" will become the component "down." When a structure is "on" or "positioned on" another structure, it may mean that a structure is integrally formed on another structure, or that a structure is "directly" arranged on another structure, or that a structure is arranged "indirectly" on another structure through another structure.

The terms "a," "an," "the," and "said" are used to indicate that there are one or more elements, components, etc. The terms "comprising" and "having" are used to indicate open-ended inclusion, and refers to that, in addition to the listed elements, components, etc., there may be other elements, components, etc. The terms "first" and "second" are used only as labels, and are not intended to be a limitation on the number of objects. The term "substantially" can describe an approximate fit, value, direction, orientation, or other parameter within a predetermined tolerance such as 1%, 2%, 3%, 4%, 5%, or another predetermined tolerance.

It should be emphasized that the above-described embodiments of the present disclosure are merely possible examples of implementations set forth for a clear understanding of the principles of the disclosure. While a feature can be described in connection with a particular figure, the feature can also be combined with features of the other figures. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A dual-power lantern, comprising:

a first power source operable to power a first light source that emits light through a diffuser of the dual-power lantern;

a second power source operable to power a second light source that emits light through the diffuser of the dual-power lantern;

at least one switching component that switches between configurations comprising: a first configuration in which the first power source powers the first light source to emit a first amount of light through the diffuser, and a second configuration in which the second power source powers the second light source to emit a second amount light through the diffuser; and at least one illuminated power selection indicator that indicates that the dual-power lantern is operating using a selected one of configurations.

2. The dual-power lantern of claim 1, wherein the configurations comprise: the first configuration, the second configuration, and a third configuration in which both the first power source powers the first light source and the second power source powers the second light source, thereby providing a greater amount of light than a respective one of the first configuration and the second configuration.

3. The dual-power lantern of claim 2, wherein the first configuration, the second configuration, and the third configuration cause different amounts of light to be emitted.

4. The dual-power lantern of claim 1, wherein the first power source is a rechargeable power source and the second power source is a non-rechargeable power source.

5. The dual-power lantern of claim 1, further comprising at least one illuminated low-power indicator that indicates low power for a selected configuration.

6. The dual-power lantern of claim 5, further comprising circuitry that automatically switches to a different one of a plurality of configurations in response to detecting a power level at or below a threshold power level identified for the selected configuration.

7. A method of operating a dual-power lighting device comprising:

providing a first power source operable to power a first light source;

providing a second power source operable to power a second light source, wherein the first power source is permanently or semi permanently sealed within a body of the dual-power lighting device, and the second power source is removably sealed behind a toolless opening hatch; and switching, using at least one switching component, between configurations comprising: a first configuration in which the first power source powers the first light source to activate, and a second configuration in which the second power source powers the second light source to activate.

8. The method of claim 7, wherein the configurations comprise: the first configuration, the second configuration, and a third configuration in which the first power source powers the first light source and the second power source powers the second light source concurrently to provide a greater amount of light than a respective one of the first configuration and the second configuration.

9. The method of claim 7, wherein a respective one of the configurations causes a different amount of light to be emitted.

10. The method of claim 7, wherein the first power source is a rechargeable power source and the second power source is a non-rechargeable power source.

11. The method of claim 7, further comprising: providing at least one illuminated low-power indicator that indicates low power for a selected one of the configurations.

12. The method of claim 11, further comprising: providing circuitry that automatically switches from a selected configuration corresponding to the selected one of the configurations to a different configuration in response to detecting a power level at or below a threshold power level identified for the selected configuration.

13. A system, comprising:

a first power source operable to power a first light source;

a second power source operable to power a second light source; and at least one switching component that switches between configurations comprising: a first configuration in which the first power source powers the first light source to activate, and a second configuration in which the second power source powers the second light source to activate;

a cartridge comprising the first power source and the second power source that comprises at least one alignment tab that provides an alignment with at least one alignment component of a body of a lighting device.

14. The system of claim 13, wherein the configurations further comprise: a third configuration in which the first power source powers the first light source and the second power source powers the second light source concurrently to provide a greater amount of light than a respective one of the first configuration and the second configuration.

15. The system of claim 13, wherein the first power source is a rechargeable power source and the second power source is a non-rechargeable power source.

16. The system of claim 13, wherein the first power source is permanently or semi permanently sealed within a body of a lighting device, and the second power source is removably sealed behind a toolless opening hatch.

17. The system of claim 13, wherein the first power source is sealed within a body of a lighting device, or sealed within the cartridge, the comprising the first power source and the second power source.

18. A dual-power lantern, comprising:

a first power source operable to power a first light source that emits light through a diffuser of the dual-power lantern;

a second power source operable to power a second light source that emits light through the diffuser of the dual-power lantern;

at least one switching component that switches between configurations comprising: a first configuration in which the first power source powers the first light source to emit a first amount of light through the diffuser, and a second configuration in which the second power source powers the second light source to emit a second amount light through the diffuser; and at least one illuminated low-power indicator that indicates low power for a selected one of the configurations.

19. The dual-power lantern of claim 18, further comprising circuitry that automatically switches to a different one of a plurality of configurations in response to detecting a power level at or below a threshold power level identified for the selected configuration.

20. The dual-power lantern of claim 18, wherein:

the configurations comprise: the first configuration, the second configuration, and a third configuration in which both the first power source powers the first light source and the second power source powers the second light source, thereby providing a greater amount of light than a respective one of the first configuration and the second configuration; and the first configuration, the second configuration, and the third configuration cause different amounts of light to be emitted.

* * * * *